(12) United States Patent
Sutton et al.

(10) Patent No.: US 12,393,764 B2
(45) Date of Patent: Aug. 19, 2025

(54) THERMALLY COUPLED AWARE DEVICE PLACEMENT

(71) Applicant: International Business Machines Corporation, Armonk, NY (US)

(72) Inventors: Akil Khamisi Sutton, Poughkeepsie, NY (US); Peter A Smith, Wappingers Falls, NY (US); Glen A. Wiedemeier, Austin, TX (US); William Edward Ansley, Round Rock, TX (US); John Greg Massey, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 17/567,978

(22) Filed: Jan. 4, 2022

(65) Prior Publication Data
US 2023/0214573 A1     Jul. 6, 2023

(51) Int. Cl.
*G06F 30/398* (2020.01)
*G06F 30/392* (2020.01)
*G06F 30/3947* (2020.01)

(52) U.S. Cl.
CPC .......... *G06F 30/398* (2020.01); *G06F 30/392* (2020.01); *G06F 30/3947* (2020.01)

(58) Field of Classification Search
USPC ....................................................... 716/102
See application file for complete search history.

(56) References Cited

U.S. PATENT DOCUMENTS

| 7,472,363 | B1 | 12/2008 | Chandra |
| 9,103,732 | B2 | 8/2015 | Alameh et al. |
| 10,867,109 | B2 | 12/2020 | Tseng et al. |
| 2020/0134132 | A1* | 4/2020 | Yu Tseng .............. G06F 30/398 |

OTHER PUBLICATIONS

Anonymously, "Adaptive Self-Heating Circuit Control." IP.Com, Sep. 1, 2015. p. 4.

(Continued)

*Primary Examiner* — Bryce M Aisaka
(74) *Attorney, Agent, or Firm* — CANTOR COLBURN LLP; Randy Emilio Tejeda (57) ABSTRACT

Embodiments include thermally coupled aware device placement in the schematic design stage of the development of an integrated circuit. Aspects of the invention include obtaining a schematic design of a macro, the schematic design including a plurality of devices disposed within the macro. Aspects also include determining an initial temperature for each of the plurality of devices, where the initial temperature due to self-heating. Aspects further include determining, iteratively for each of the plurality of devices, an uplift temperature, where the uplift temperature for a first device of the plurality of devices is determined based on the initial temperature of each of the other plurality of devices and a distance between the first device and each of the other plurality of devices as encoded in the schematic design. Aspects also include modifying the schematic design of the macro based on a determination that the uplift temperature of at least one of the plurality of devices is above a threshold value.

17 Claims, 7 Drawing Sheets

(56) References Cited

OTHER PUBLICATIONS

Anonymously, "Energy Saving Through Temperature Aware Storage Placement and Workload." IP.Com. May 5, 2011. 5 Pages.
Anonymously, "Thermal-Aware Design Rule Checking of Chip Layout." IP.Com, Jul. 16, 2008. 4 Pages.
Jiao, F. et al., "Thermal-Aware Placement and Routing for 3D Optical Networks-on-Chips." IEEE 2018. 4 Pages.
Schlitt, LM. et al., "A Methodology for Thermal Characterization Abstraction of Integrated Opto-Electronic Layouts." 2017. 6 Pages.
Taneja, S., "Thermal-Aware Resource Management in Energy Efficient Clusters." Dissertation, Aug. 4, 2018. 106 Pages.

\* cited by examiner

THERMALLY COUPLED AWARE DEVICE PLACEMENT

BACKGROUND

The present invention generally relates to integrated circuit development, and more specifically, to integrated circuit development using thermally coupled aware device placement.

The development of an integrated circuit (i.e., chip) involves several stages from design through fabrication. The chip may be subdivided into hierarchical levels to simplify design and testing tasks at different stages. Generally, a cell or macro may be regarded as a sub-section of the chip. For example, each macro may comprise several cells. Once the design is finalized, tests may be completed to ensure that design rules are met before fabrication. One such test ensures that electric currents are within electromigration (EM) limits as prescribed by design geometries and use conditions. In general, a current passing through conductive lines induces energetic interactions in the wire. These interactions ultimately result in the movement of the metal atoms resulting from momentum transfer between the electrons passing through the conductive lines and the metal atoms comprising the conductive lines. EM can cause the accumulation of excess metal and/or the depletion of initial metal in the wire which, in turn, tends to result in short or open circuits.

The predicted failure for conductive lines caused by EM is estimated by taking into consideration several operative factors including, but not limited to, the size of the conductive lines, the composition of the conductive lines, the microstructure of the conductive lines, the current density carried by the conductive lines, the duty cycle over which the current is applied to the conductive lines, the operating temperature of the conductive lines, and cumulative use. EM evaluation, analysis, and signoff methodologies applied to a particular integrated circuit design attempt to take all of the operative factors into consideration to provide a reasonable and prudent estimate regarding the lifetime of semiconductor devices manufactured using the integrated circuit design to avoid premature failure of the semiconductor devices.

Currently, such EM evaluation and analysis is performed after a floorplan layout and routing of a macro has been created. As a result, any failure of the EM analysis may require both the floorplan layout and routing to be modified.

SUMMARY

Embodiments of the present invention are directed to integrated circuit development using thermally coupled aware device placement. A non-limiting example computer-implemented method includes obtaining a schematic design of a macro, the schematic design including a plurality of devices disposed within the macro. The method also includes determining an initial temperature for each of the plurality of devices, where the initial temperature due to self-heating. The method further includes determining, iteratively for each of the plurality of devices, an uplift temperature, where the uplift temperature for a first device of the plurality of devices is determined based on the initial temperature of each of the other plurality of devices and a distance between the first device and each of the other plurality of devices as encoded in the schematic design. The method also includes modifying the schematic design of the macro based on a determination that the uplift temperature of at least one of the plurality of devices is above a threshold value.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, integrated circuit development may involve several stages that include the schematic design, floorplan layout, and fabrication. As also noted, electromigration (EM) evaluation and analysis are traditionally performed after a floorplan layout of a macro has been created.

As a result, any failure of the EM analysis requires changes to be made to the schematic design and for a new floorplan layout to be created.

Embodiments of the present invention overcome the shortcomings of the current methods by performing thermally coupled aware device placement in the schematic design stage of the development of an integrated circuit. By performing thermally coupled aware device placement during the schematic design stage the amount of time spent creating a floorplan layout which is discarded due to EM analysis reduced and the overall time needed for integrated circuit development is reduced.

Figure 1:
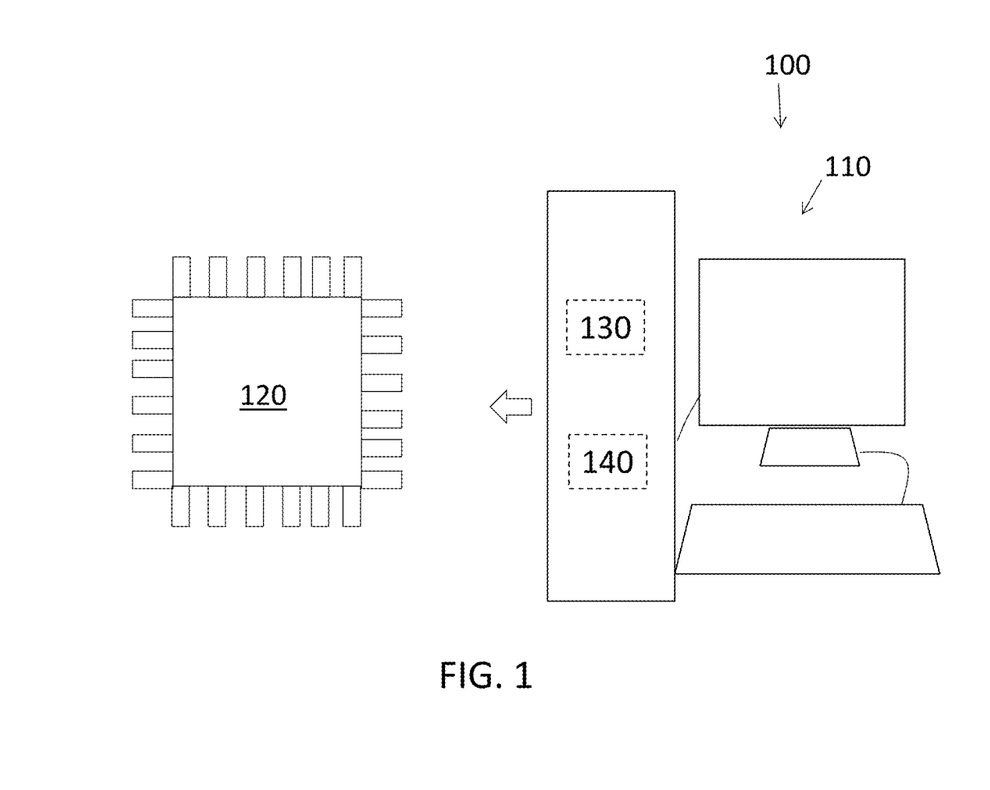
FIG. 1 is a block diagram of a system to perform the development of an integrated circuit using thermally coupled aware device placement according to one or more embodiments of the invention.

FIG. 1 is a block diagram of a system 100 to perform thermally coupled aware device placement in the schematic design stage of the development of an integrated circuit according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, design data is provided to a foundry where masks are generated for each layer of the integrated circuit based on the finalized physical layout. Then, the wafer is processed in the sequence of the mask order. The processing includes photolithography and etch. This is further discussed with reference to FIG. 5.

Figure 2:
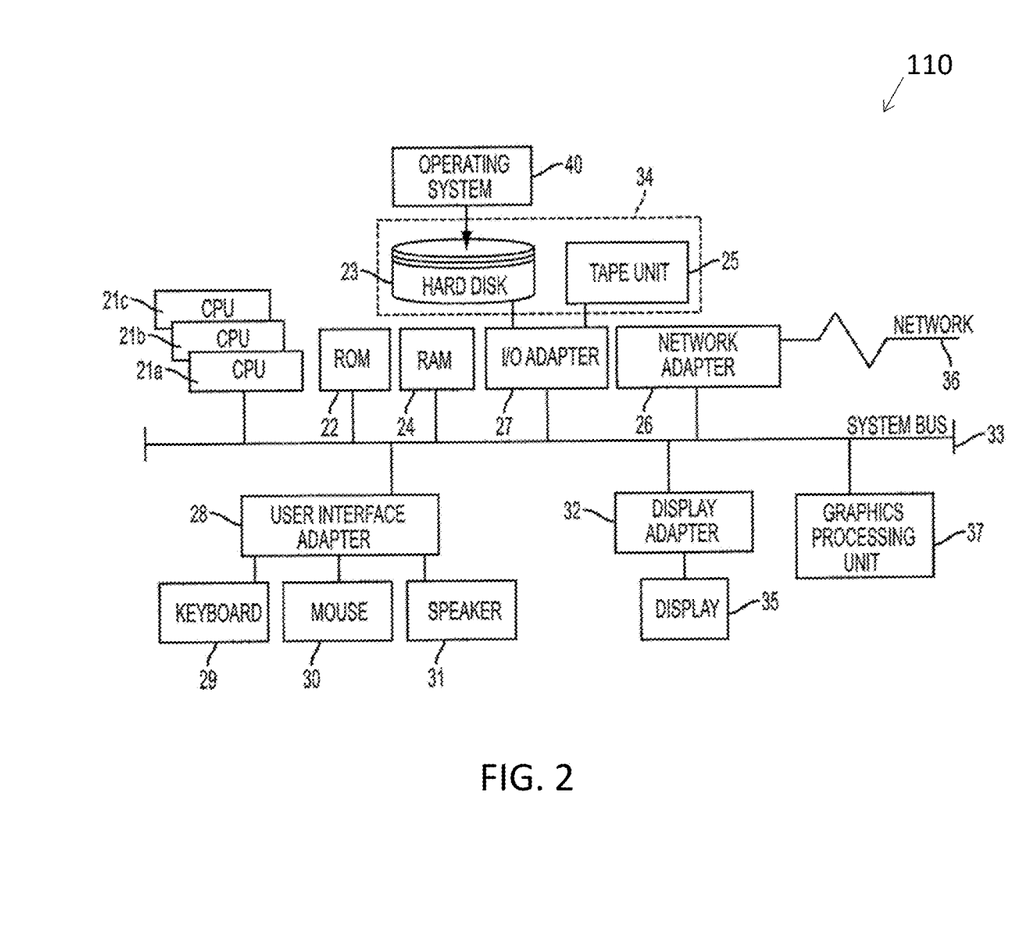
FIG. 2 is a block diagram of a processing system to generate the design that is fabricated into the integrated circuit according to one or more embodiments of the invention.

FIG. 2 is a block diagram of a processing system 110 used to generate the design that is fabricated into the integrated circuit 120. The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in the processing system 110.

Figure 3:
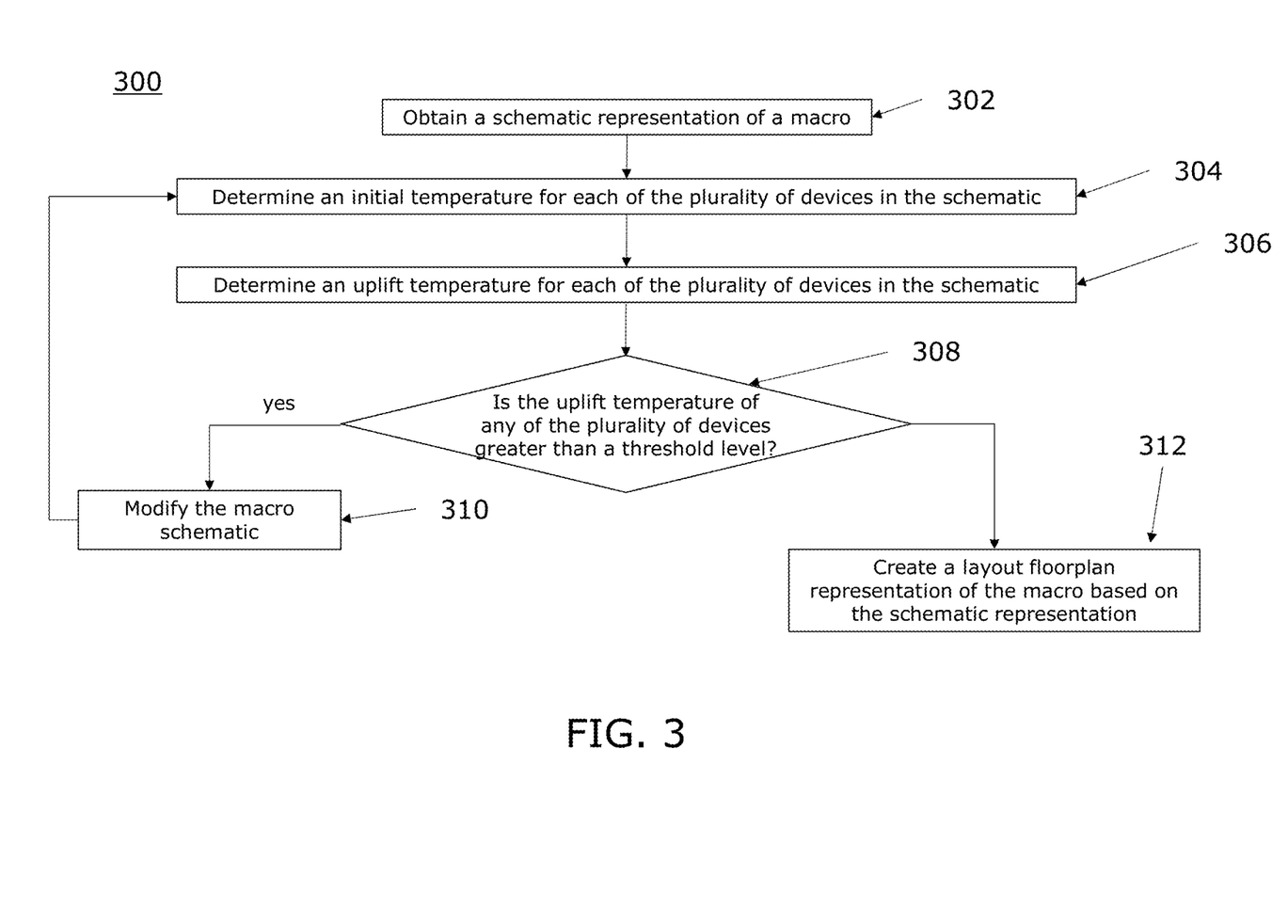
FIG. 3 is a process flow of a method of thermally coupled aware device placement in the development of an integrated circuit according to one or more embodiments of the invention.

FIG. 3 is a process flow of a method 300 for thermally coupled aware device placement in the development of an integrated circuit according to one or more embodiments of the invention is shown. The method 300 begins at block 302 by obtaining a schematic design of a of a macro. In exemplary embodiments, the macro schematic includes a plurality of devices. Next, as shown at block 304 the method 300 includes determining an initial temperature for each of the plurality of devices. In exemplary embodiments, the initial temperature of each device is due to a combination of ambient temperature and device self-heating, which is determined based on the characteristics of the device, such as its size, and upon a current flow through the device.

The method 300 also includes determining an uplift temperature for each of the plurality of devices in the macro schematic, as shown at block 306. In exemplary embodiments, the uplift temperatures for each of the plurality of devices are iteratively calculated by evaluating each device one at a time. The uplift temperature for a first device of the plurality of devices is determined based on the initial temperature of each of the other plurality of devices and a distance between the first device and each of the other plurality of devices, as encoded in the schematic representation. In one embodiment, the uplift temperature for a first device of the plurality of devices is determined by adding the initial temperature of the first device to a sum of each of the initial temperatures of each of the other plurality of devices multiplied by a coupling factor. In one embodiment, the coupling factor is a function, which is continuous, of the distance between the first device and each of the other plurality of devices. In one embodiment the uplift temperature is calculated based on the following formula:

$$\Delta T_{Uplifted} = \Delta T_{Initial} + \sum_{i=1}^{n} \beta_i$$

$$\text{where } \beta_i = \frac{\Delta T_{X,Y=x_i,y_i}}{\Delta T_{X,Y=0}}$$

In one embodiment, n is the number of devices in close proximity to the device being evaluated. In another embodiment, n is one less than the total number of devices in the macro. β is a coupling factor that is used to scale the heating effects of each of the other devices on the device being evaluated based on the distance between the devices. Next, as shown at decision block 308, the method 300 includes determining if the uplift temperature of an evaluated device resulting from the plurality of devices is greater than a threshold level. In one embodiment, the threshold level is the same for each of the plurality of devices. In another embodiment, the threshold level for each of the plurality of devices is determined based on the characteristics of the device, and accordingly, each of the plurality of devices may have a different threshold level. Based on a determination that the uplift temperature of at least one of the plurality of devices is above a threshold value, the method 300 proceeds to block 310 and includes creating a modified schematic design of the layer of the macro. In exemplary embodiments, creating a modified schematic design of the layer of the macro includes changing the distance between one or more of the plurality of devices, as encoded by device coordinates in the schematic representation of the macro. In some embodiments, creating a modified macro schematic includes changing the size of one or more of the plurality of devices.

In exemplary embodiments, once a modified schematic design is created, the method 300 includes determining an updated initial temperature for each of the plurality of devices based on the modified schematic design and determining, iteratively for each of the plurality of devices, an updated uplift temperature, wherein the updated uplift temperature for a first device of the plurality of devices is determined based on the initial temperature of each of the other plurality of devices and a distance between the first device and each of the other plurality of devices. Based on a determination that the uplift temperature of all of the plurality of devices is below a threshold value, the method 300 proceeds to block 312 and creates a layout floorplan of the layer of the macro based on the schematic design.

Figure 4A:
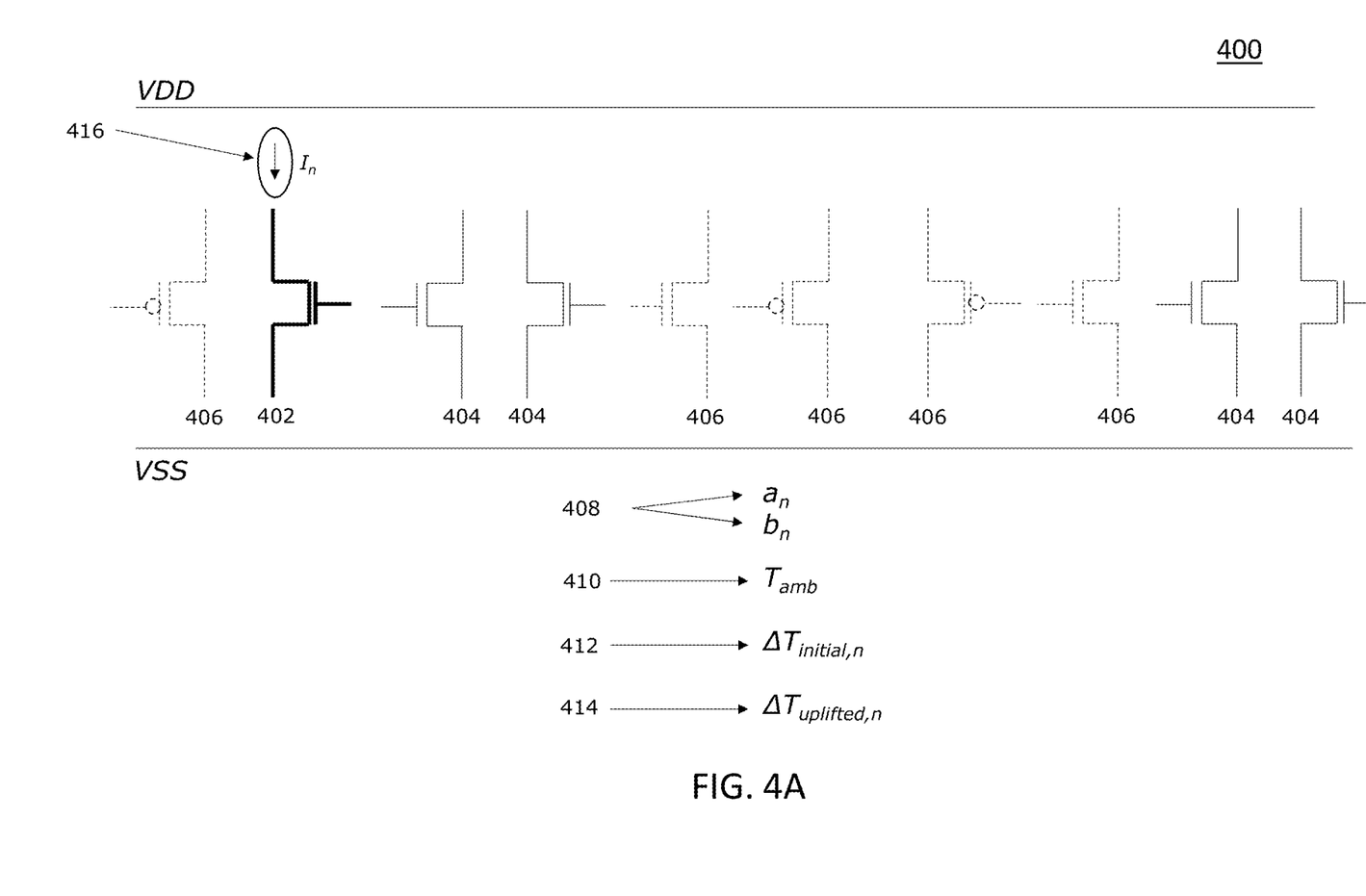
FIG. 4A illustrates a schematic representation of a plurality of devices being evaluated for placement in a macro according to one or more embodiments of the invention.

FIG. 4A is a diagram 400 of a schematic representation a plurality of devices 402, 404 and 406. The transistor-level specifications of a macro are first implemented through schematic abstractions. This allows for rapid iteration of component choices toward achieving performance objectives. As illustrated, the schematic diagram 400 includes a plurality of devices being considered for thermally coupled aware device placement in layout. In an exemplary embodiment, a first device 402 (bold lines) is evaluated for thermally coupled aware device placement with respect to a plurality of devices 404 (solid lines) that are in close proximity to the first device 402, and a plurality of devices 406 (dashed lines) that are not in close proximity to the first device 402. Every device 402, 404 and 406 is associated with several properties 408 that collectively uniquely define each instance of a device as a formulation of a base device. These properties include device width, device length, device physical location co-ordinates $(a_n, b_n)$ 408, ambient temperature $T_{amb}$ 410, an initial self-heating temperature $\Delta T_{initial,n}$ 412, and an uplifted self-heating temperature $\Delta T_{uplifted,n}$ 414. Following a simulation, additional electrical information such as the device currents IN 416 are also uniquely associated to devices 402, 404 and 406.

A necessary by-product of power dissipation in devices 402, 404 and 406 is thermal energy which results in a temperature increase $\Delta T_{initial,n}$ 408 of the device in addition to a global ambient temperature $T_{amb}$ that applies to all devices. Furthermore, given the attached property of device physical location co-ordinates $(a_n, b_n)$ 408, an uplift self-heating temperature $\Delta T_{initial,n}$ 414 is calculated based on the distance dependent relationships among the plurality of devices 404 and 406.

Figure 4B:
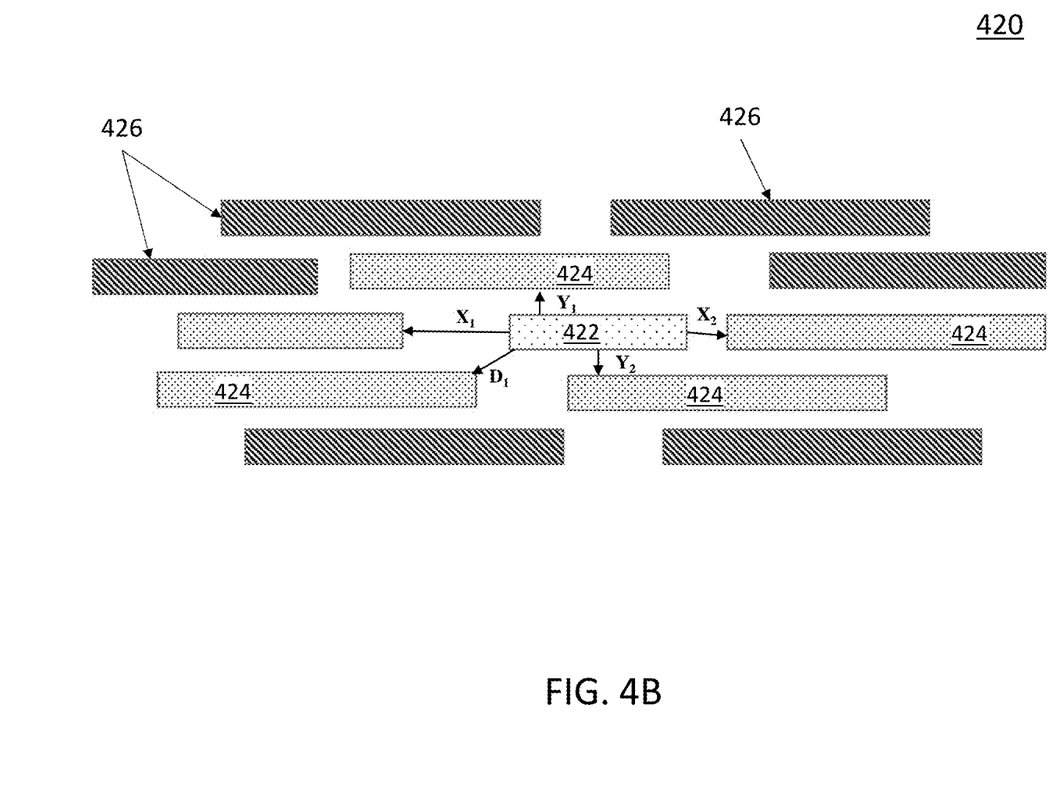
FIG. 4B illustrates a layout floorplan diagram of a device being evaluated for placement in a macro according to one or more embodiments of the invention.

An abstracted view of the floorplan layout representation 420 of the macro is now shown in FIG. 4B. This abstracted representation 420 corresponds to the schematic representation 400 of FIG. 4A. Referring now to FIG. 4B a layout floorplan diagram 420 of a macro being evaluated for thermally coupled aware device placement in the stage of the development of an integrated circuit according to one or more embodiments of the invention are shown. As shown in FIG. 4B, the floorplan diagram 420 includes a plurality of devices 422, 424 and 426. As illustrated, the floorplan diagram 420 includes a first device 422 that is being evaluated for thermally coupled aware device placement, a plurality of devices 424 that are in close proximity to the first device 422, and a plurality of devices 426 that are not in close proximity to the first device 422. In one embodiment, a device 424 is considered to be in close proximity to the first device 422 if there are no devices disposed between the first device and the device 424. Conversely, a device 426 is considered to not be in close proximity to the first device 422 if there is a device disposed between the first device and the device 426. In other embodiments, a threshold distance can be used to distinguish close proximity devices 424 from devices 426. As discussed above, in one embodiment only the heating effects of close proximity devices 424 are evaluated when determining an uplift temperature of the first device 422. In other embodiments, the heating effects of all devices 424 and 426 are evaluated when determining an uplift temperature of the first device 422.

Figure 5:
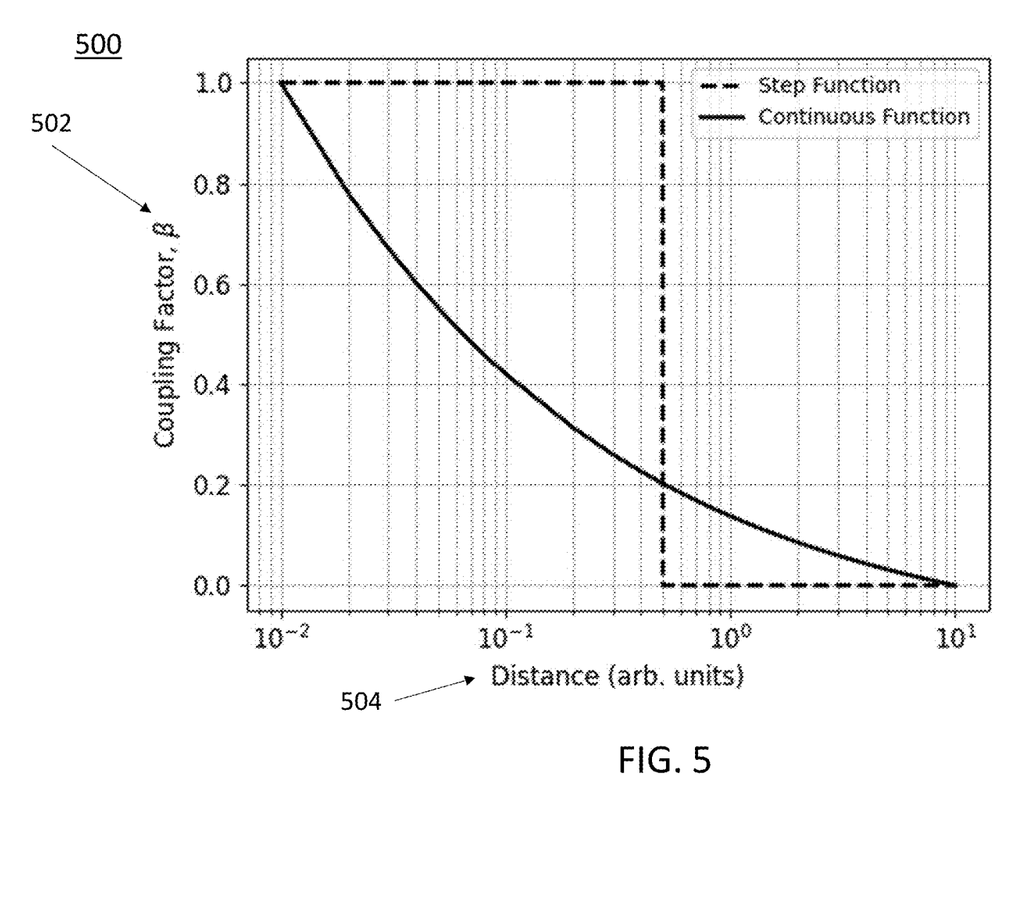
FIG. 5 illustrates a graph of a coupling factor for thermally coupled aware device placement in the development of an integrated circuit according to one or more embodiments of the invention.

FIG. 5 illustrates a graph 500 of a coupling factor (β) 502 for thermally coupled aware device placement in the development of an integrated circuit according to one or more embodiments of the invention. As illustrated, the coupling factor (β) 502 is a continuous function of the distance 504 between two devices. In contrast, previous methods for evaluating the heating effects between devices have used a step function, such as the one shown, which has a discontinuity at a specified distance. In one embodiment, the coupling factor (β) 502 is defined as:

$$\beta_i = \frac{\Delta T_{X,Y=x_i y_i}}{\Delta T_{X,Y=0}}$$

where X and Y are cartesian coordinates of the device under evaluation and $X_i$ and $Y_i$ are the cartesian coordinates of the other devices on the layer of the macro. In other embodiments, a radial distance between the centroids of a first device and each of the plurality of devices is used rather than the cartesian coordinates.

In exemplary embodiments, two or more of the devices in a macro schematic can be designated as matched devices, which indicates that the difference between the operating conditions, i.e., the uplift temperature, of the two devices should be minimized. Accordingly, any modifications to the schematic design are evaluated to ensure that any difference between the uplift temperatures of the pair devices is minimized. In one embodiment, if the difference between the uplift temperatures of two or more matched devices is greater than a threshold level, the schematic design is modified to reduce the difference between the uplift temperatures of the matched devices. In this embodiment, the schematic design is modified by changing the distance between one of the paired devices and another device that has a high coupling factor with the one or more of the paired devices.

Figure 6:
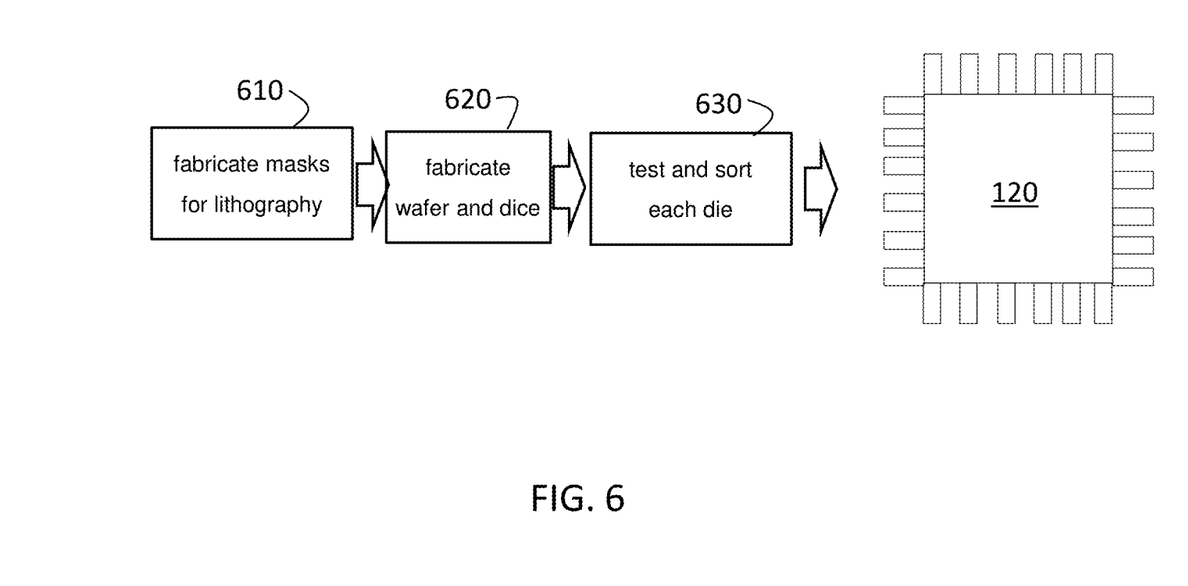
FIG. 6 is a process flow of a method of fabricating the integrated circuit according to exemplary embodiments of the invention.

FIG. 6 is a process flow of a method 600 of fabricating the integrated circuit according to exemplary embodiments of the invention. Once the physical design data is obtained, based, in part, on the processes discussed with reference to FIG. 3, the integrated circuit 120 can be fabricated according to known processes that are generally described with reference to FIG. 6. Generally, a wafer with multiple copies of the final design is fabricated and cut (i.e., diced) such that each die is one copy of the integrated circuit 120. At block 610, the processes include fabricating masks for lithography based on the finalized physical layout. At block 620, fabricating the wafer includes using the masks to perform photolithography and etching. Once the wafer is diced, testing and sorting each die is performed, at block 630, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for thermally coupled aware device placement, the method comprising:
   obtaining a schematic design of a macro, the schematic design including a plurality of devices disposed within the macro;
   determining an initial temperature for each of the plurality of devices, wherein the initial temperature due to self-heating;
   determining, iteratively for each of the plurality of devices, an uplift temperature, wherein the uplift temperature for a first device of the plurality of devices is calculated by adding the initial temperature of the first device to a sum of each of the initial temperatures of each of the other plurality of devices multiplied by a coupling factor, which is a continuous function of the distance between the first device and each of the other plurality of devices; and
   based on a determination that the uplift temperature of at least one of the plurality of devices is above a threshold value, modifying the schematic design of the macro,
   wherein the threshold level for each of the plurality of devices is determined based on the characteristics of the device.

2. The method of claim 1, wherein modifying the schematic design of a macro includes changing a distance, as encoded in schematic, between one or more of the plurality of devices.

3. The method of claim 1, wherein modifying the schematic design of a macro includes changing a size of one or more of the plurality of devices.

4. The method of claim 1, further comprising:
   determining an updated initial temperature for each of the plurality of devices based on the modified schematic design, wherein the initial temperature is due to self-heating;
   determining, iteratively for each of the plurality of devices, an updated uplift temperature, wherein the updated uplift temperature for a first device of the plurality of devices is determined based on the initial temperature of each of the other plurality of devices and a distance between the first device and each of the other plurality of devices; and
   based on a determination that the updated uplift temperature of at least one of the plurality of devices is above a threshold value, further modifying the modified schematic design of the macro.

5. The method of claim 4, further comprising:
   based on a determination that the updated uplift temperature of each of the plurality of devices are below the threshold value, creating a layout floorplan of the macro based on the modified schematic design.

6. The method of claim 1, wherein the continuous function for determining the coupling factor comprises an exponential decay function based on the distance between devices, wherein the exponential decay function provides a smooth transition of thermal coupling effects as the distance between devices increases.

7. The method of claim 1, wherein determining the threshold value for each device comprises:
   analyzing electrical and thermal characteristics of each device including maximum operating temperature, power density, and current density specifications; and
   setting individual threshold values for each device based on the analyzed characteristics.

8. The method of claim 1, further comprising:
   generating a thermal coupling matrix representing coupling factors between each pair of devices in the plurality of devices;
   updating the thermal coupling matrix after each modification to the schematic design; and
   using the updated thermal coupling matrix to determine subsequent uplift temperature calculations.

9. A system comprising:
   a memory having computer readable instructions; and
   one or more processors for executing the computer readable instructions, the computer readable instructions controlling the one or more processors to perform operations comprising:
      obtaining a schematic design of a macro, the schematic design including a plurality of devices disposed within the macro;
      determining an initial temperature for each of the plurality of devices, wherein the initial temperature due to self-heating;
      determining, iteratively for each of the plurality of devices, an uplift temperature, wherein the uplift temperature for a first device of the plurality of devices is calculated by adding the initial temperature of the first device to a sum of each of the initial temperatures of each of the other plurality of devices multiplied by a coupling factor, which is a continuous function of the distance between the first device and each of the other plurality of devices; and
      based on a determination that the uplift temperature of at least one of the plurality of devices is above a threshold value, modifying the schematic design of the macro,
   wherein the threshold level for each of the plurality of devices is determined based on the characteristics of the device.

10. The system of claim 9, wherein modifying the schematic design of a macro includes changing a distance, as encoded in schematic, between one or more of the plurality of devices.

11. The system of claim 9, wherein modifying the schematic design of a macro includes changing a size of one or more of the plurality of devices.

12. The system of claim 9, wherein the operations further comprise:
    determining an updated initial temperature for each of the plurality of devices based on the modified schematic design, wherein the initial temperature is due to self-heating;
    determining, iteratively for each of the plurality of devices, an updated uplift temperature, wherein the updated uplift temperature for a first device of the plurality of devices is determined based on the initial temperature of each of the other plurality of devices and a distance between the first device and each of the other plurality of devices; and
    based on a determination that the updated uplift temperature of at least one of the plurality of devices is above a threshold value, further modifying the modified schematic design of the macro.

13. The system of claim 12, wherein the operations further comprise:
    based on a determination that the updated uplift temperature of each of the plurality of devices are below the threshold value, creating a layout floorplan of the macro based on the modified schematic design.

14. A computer program product comprising a computer readable storage medium having program instructions embodied therewith, the program instructions executable by a processor to cause the processor to perform operations comprising:
 obtaining a schematic design of a macro, the schematic design including a plurality of devices disposed within the macro;
 determining an initial temperature for each of the plurality of devices, wherein the initial temperature due to self-heating;
 determining, iteratively for each of the plurality of devices, an uplift temperature, wherein the uplift temperature for a first device of the plurality of devices is calculated by adding the initial temperature of the first device to a sum of each of the initial temperatures of each of the other plurality of devices multiplied by a coupling factor, which is a continuous function of the distance between the first device and each of the other plurality of devices; and
 based on a determination that the uplift temperature of at least one of the plurality of devices is above a threshold value, modifying the schematic design of the macro,
 wherein the threshold level for each of the plurality of devices is determined based on the characteristics of the device.

15. The computer program product of claim 14, wherein modifying the schematic design of a macro includes changing a distance, as encoded in schematic, between one or more of the plurality of devices.

16. The computer program product of claim 14, wherein modifying the schematic design of a macro includes changing a size of one or more of the plurality of devices.

17. The computer program product of claim 14, wherein the operations further comprise:
 determining an updated initial temperature for each of the plurality of devices based on the modified schematic design, wherein the initial temperature is due to self-heating;
 determining, iteratively for each of the plurality of devices, an updated uplift temperature, wherein the updated uplift temperature for a first device of the plurality of devices is determined based on the initial temperature of each of the other plurality of devices and a distance between the first device and each of the other plurality of devices; and
 based on a determination that the updated uplift temperature of at least one of the plurality of devices is above a threshold value, further modifying the modified schematic design of the macro.

* * * * *